(12) United States Patent
Mei et al.

(10) Patent No.: US 11,079,140 B2
(45) Date of Patent: Aug. 3, 2021

(54) SYSTEM AND METHOD FOR RECLAIMING CARBON FIBERS USING SOLAR ENERGY

(71) Applicant: The Boeing Company, Chicago, IL (US)

(72) Inventors: ShengWei Mei, Xining (CN); Qiang Lu, Beijing (CN); XiaoDai Xue, Beijing (CN); XiaoTao Chen, Xining (CN); LaiJun Chen, Beijing (CN); Yang Si, Xining (CN)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 16/346,687

(22) PCT Filed: Dec. 8, 2017

(86) PCT No.: PCT/US2017/065332
§ 371 (c)(1),
(2) Date: May 1, 2019

(87) PCT Pub. No.: WO2018/125540
PCT Pub. Date: Jul. 5, 2018

(65) Prior Publication Data
US 2019/0277538 A1    Sep. 12, 2019

(30) Foreign Application Priority Data

Dec. 29, 2016   (CN) .......................... 201611248783.0

(51) Int. Cl.
*F24S 20/30*        (2018.01)
*F24S 23/79*        (2018.01)
(Continued)

(52) U.S. Cl.
CPC ............... *F24S 20/30* (2018.05); *C08J 11/00* (2013.01); *F24S 20/20* (2018.05); *F24S 23/77* (2018.05);
(Continued)

(58) Field of Classification Search
CPC .. F24S 20/30; F24S 23/79; F24S 20/20; F24S 23/77; F24S 30/45; F24S 2020/23;
(Continued)

(56) References Cited

U.S. PATENT DOCUMENTS

2002/0027504 A1   3/2002   Davis et al.
2005/0132883 A1   6/2005   Su et al.
(Continued)

FOREIGN PATENT DOCUMENTS

CN        104327301        2/2015
JP        2008-285600      11/2008

OTHER PUBLICATIONS

International Searching Authority: International Preliminary Report on Patentability, App. No. PCT/US2017/065332 (dated Jul. 2, 2019).
(Continued)

*Primary Examiner* — Alfred Basichas
(74) *Attorney, Agent, or Firm* — Walters & Wasylyna LLC (57) ABSTRACT

A system for reclaiming carbon fiber from carbon fiber containing material using solar energy includes a sunlight focusing system, a sample platform for placement of carbon fiber containing material to be treated by focused sunlight from the sunlight focusing system, the sample platform being provided with a gas absorption pipe, and a waste gas treatment system connected with the gas absorption pipe.

20 Claims, 6 Drawing Sheets

(51) Int. Cl.
*F24S 20/20* (2018.01)
*F24S 23/77* (2018.01)
*C08J 11/00* (2006.01)
*F24S 30/45* (2018.01)
*B29K 707/04* (2006.01)
*F24S 23/70* (2018.01)
*C08K 7/06* (2006.01)

(52) U.S. Cl.
CPC ............... *F24S 23/79* (2018.05); *F24S 30/45* (2018.05); *B29K 2707/04* (2013.01); *C08K 7/06* (2013.01); *F24S 2020/23* (2018.05); *F24S 2023/832* (2018.05); *Y02E 10/40* (2013.01); *Y02E 10/47* (2013.01)

(58) Field of Classification Search
CPC . F24S 2023/832; C08J 11/00; B29K 2707/04; B29K 2105/08; C08K 7/06; Y02E 10/40; Y02E 10/47; B29B 17/02; B29B 17/04; B29B 2017/0496
See application file for complete search history.

(56) References Cited

U.S. PATENT DOCUMENTS

| | | |
|---|---|---|
| 2011/0315539 A1 | 12/2011 | Zadik et al. |
| 2012/0160743 A1 | 6/2012 | Delbianco et al. |
| 2013/0180520 A1 | 7/2013 | Raade et al. |
| 2014/0120026 A1 | 5/2014 | Itazu et al. |
| 2014/0158114 A1* | 6/2014 | Ishida ............... F03G 6/065 126/688 |
| 2016/0039118 A1 | 2/2016 | Gehr |

OTHER PUBLICATIONS

TigerTek, "Common Industrial Applications for Servo Motors," (Mar. 16, 2016) http://www.tigertek.com/servo-motor-resources/common-servo-motor-applications.html.

International Searching Authority: International Search Report and Written Opinion, App. No. PCT/US2017/065322 (dated Apr. 24, 2018).

European Patent Office, Extended European Search Report, App. No. 17887126.5 (dated Oct. 9, 2020).

* cited by examiner

SYSTEM AND METHOD FOR RECLAIMING CARBON FIBERS USING SOLAR ENERGY

PRIORITY

This application is a U.S. national phase application of Intl. App. No. PCT/US2017/065332 filed on Dec. 8, 2017, which claims priority from Chinese Patent Application No. 201611248783.0 titled "A Two-Step Method for Carbon Fiber Recycling Using Solar Energy," which was filed on Dec. 29, 2016.

FIELD

The present description belongs to the field of carbon fiber recycling, particularly relates to novel systems and methods for reclaiming carbon fibers using solar energy.

BACKGROUND

Carbon fiber materials feature light weight, high mechanical strength, good corrosion resistance and low thermal expansion, and are widely used in industrial fields of aerospace, automobile, construction and communication. With the rapid development of industries such as aerospace, automobile manufacturing and sporting goods, there is an increasing demand for carbon fiber materials. Even though the carbon fiber materials have many outstanding advantages, recycling of wastes thereof is challenging.

At present, there are mainly three methods for the recycling treatment of composite carbon fiber wastes, including physical recycling, chemical recycling and energy recycling. In the three recycling methods, raw materials are heated to a thermal decomposition temperature, such as by a combustion process of fossil fuels. Accordingly, energy consumption is great and carbon emissions are produced in the combustion process.

Another problem is secondary utilization of carbon fiber materials after being recycled, especially in advanced fields, which is greatly dependent on the quality of recycled carbon fiber materials, namely, not only requiring resins to be completely removed, but also requiring the physical and chemical performance indices of the treated carbon fiber materials to be substantially the same with new carbon fiber materials. Currently recycled carbon fiber materials are low in bulk packing density and the physical and chemical performance indices of the recycled carbon fibers fall to meet the prescription. Thus, there is a need to develop a method for recycling carbon fiber materials with low cost, low energy consumption, low carbon emissions, increased quality of recycled carbon fiber materials, and high treating efficient so as to deal with the increasing demands for recycling of the carbon fiber wastes.

Accordingly, those skilled in the art continue with research and development in field of carbon fiber recycling.

SUMMARY

In one embodiment, a system for reclaiming carbon fiber from carbon fiber containing material using solar energy includes a sunlight focusing system, a sample platform for placement of carbon fiber containing material to be treated by focused sunlight from the sunlight focusing system, the sample platform being provided with a gas absorption pipe, and a waste gas treatment system connected with the gas absorption pipe.

In another embodiment, a method for reclaiming carbon fibers from carbon fiber reinforced polymer material using solar energy includes heating carbon fiber reinforced polymer material by irradiation from focused sunlight to remove a first portion of polymer from the carbon fiber reinforced polymer material, placing the carbon fiber reinforced polymer material having the first portion of polymer removed into a fine treatment furnace, and heating the carbon fiber reinforced polymer material in the fine treatment furnace at a predetermined temperature to remove a second portion of polymer from the carbon fiber reinforced polymer material.

Other embodiments of the disclosed systems and methods for reclaiming carbon fiber from carbon fiber containing material using solar energy will become apparent from the following detailed description, the accompanying drawings and the appended claims.

DETAILED DESCRIPTION

The present description aims at overcoming deficiencies and problems of the related art.

The present description provides a system for reclaiming carbon fiber from carbon fiber containing material using solar energy, including: a sunlight focusing system; a sample platform for placement of carbon fiber containing material to be treated by focused sunlight from the sunlight focusing system, the sample platform being provided with a gas absorption pipe; and a waste gas treatment system connected with the gas absorption pipe.

In an aspect, the sunlight focusing system includes: a plurality of heliostats focusing the sunlight; and a plurality of planar reflectors reflecting the focused sunlight to the sample platform, wherein the plurality of heliostats each include a plurality of concave reflecting mirrors.

In an aspect, the sample platform is driven by a servo-motor moving the sample platform leftward, rightward, forward and backward.

In an aspect, the gas absorption pipe is fixed to a periphery of the sample platform.

In an aspect, the waste gas treatment system includes: a dust cleaning apparatus connected with the gas absorption pipe; and a gas absorption treatment apparatus connected with the dust cleaning apparatus, wherein the dust cleaning apparatus removes particulate dusts from the gas absorbed into the gas absorption pipe by way of dust removal by filtration, and wherein the gas absorption treatment apparatus absorbs acidic substances in the gas by utilizing an alkaline solution as an absorbent.

In an aspect, the system further includes a fine treatment furnace for receiving and heating carbon fiber containing material treated at the sample platform, wherein the fine treatment furnace includes a heating cabinet, a heat sink, and a molten salt pipe.

In an aspect, the heating cabinet includes a cabinet liner and a housing, wherein an interlayer between the cabinet liner and the housing is filled with a molten salt, and wherein a heat preserved adiabatic apparatus is attached outside the housing.

In an aspect, the heat sink includes a tubular heat exchanger and a funnel-shaped photomask, wherein the tubular heat exchanger contains a molten salt therein, wherein the funnel-shaped photomask concentrates sunlight from the sunlight focusing system to the tubular heat exchanger to heat the molten salt within the tubular heat exchanger.

In an aspect, the molten salt pipe communicates a lower end of the interlayer of the heating cabinet with an upper inlet of the tubular heat exchanger of the heat sink, and communicates an upper end of the interlayer of the heating cabinet with a lower outlet of the tubular heat exchanger of the heat sink.

In an aspect, the working temperature of the molten salt is 400-580° C., and the molten salt is a binary mixed salt of $KNO_3$ and $NaNO_3$.

In an aspect, the system includes a digital control system achieving an automatic control for the reclaiming of carbon fibers from carbon fiber containing material using solar energy, the digital control system including a data acquisition device, a data transmission device, a control host and a monitoring software.

In other aspects, the sunlight focusing system may further include a tower, the plurality of heliostats may be supported by a rotatable holder, the plurality of planar reflectors may be fixed to the top of the tower, the tower may include a steel member to support the plurality of planar reflectors.

In other aspects, the sample platform may be located on the ground that is directly below the plurality of planar reflectors.

In other aspects, the dust cleaning apparatus may be connected with the gas absorption pipe through a first gas pipe and may be connected with the gas absorption treatment apparatus through a second gas pipe.

In other aspects, the fine treatment furnace may be located at the one side of the tower and connected through a molten salt pipe.

In other aspects, the plurality of heliostats may include 4-30 heliostats, and the plurality of heliostats may be configured with an automatic solar tracking control system for tracking solar trace in real time and reflecting the focused sunlight to the plurality of planar reflectors.

In other aspects, the plurality of heliostats may include 8-110 concave reflecting mirrors, may have adjustable mirror radians, may be placed in a tile-arranged configuration on the holder, and the holder may be supported by a column fixed to the ground.

In other aspects, the plurality of planar reflectors may include 4 to 30 planar reflectors, the planar reflectors 2 may be hoisted on the top of the tower 3 having a height of 10 to 50 meters, the planar reflectors may be fixedly connected with the tower via a rotating apparatus, and the rotating apparatus may be utilized to rotate the planar reflectors, so as to adjust projection positions of light spots.

In other aspects, the treated gas may be evacuated at a high point via a third gas pipe.

In other aspects, the plurality of heliostats and the plurality of planar reflectors may be disposed in a south-north arrangement. The heliostats may be located at the north side of the tower.

The present description provides a method for reclaiming carbon fibers from carbon fiber reinforced polymer material using solar energy, including: heating carbon fiber reinforced polymer material by irradiation from focused sunlight to remove a first portion of polymer from the carbon fiber reinforced polymer material; placing the carbon fiber reinforced polymer material having the first portion of polymer removed into a fine treatment furnace; and heating the carbon fiber reinforced polymer material in the fine treatment furnace at a predetermined temperature to remove a second portion of polymer from the carbon fiber reinforced polymer material.

In an aspect, the carbon fiber reinforced polymer material is heated at between 350-600° C. by the irradiation from focused sunlight.

In an aspect, the fiber reinforced polymer material is heated by the irradiation from focused sunlight to remove 40-80% of polymer from the carbon fiber reinforced polymer material.

In an aspect, the carbon fiber reinforced polymer material is heated in the fine treatment furnace to remove the remaining polymer from the carbon fiber reinforced polymer material.

In an aspect, the carbon fiber reinforced polymer material is thermosetting resin-matrix composite material containing carbon fibers.

In other aspects, the carbon fiber reinforced polymer material may be placed on a sample platform as previously or hereafter described.

In other aspects, the carbon fiber reinforced polymer material may be heated via direct irradiation by light spots generated by the sunlight focusing system, the heating temperature may be controlled between 350-600° C. so as to remove 40-80% of resin in the carbon fiber reinforced polymer material.

In other aspects, the generated dusts and harmful gas may be treated through the waste gas treatment system as previously or hereafter described.

In other aspects, the carbon fiber reinforced polymer material placed into the fine treatment furnace may be heating by an accurate control of temperature, so as to remove the remaining resin in the carbon fiber composite material, such that carbon fibers with a high quality are recycled.

The detailed embodiments of the present description are further described in detail below in conjunction with the drawings. The following embodiments are used for illustrating the present description, rather than limiting the scope of the invention.

Figure 1:
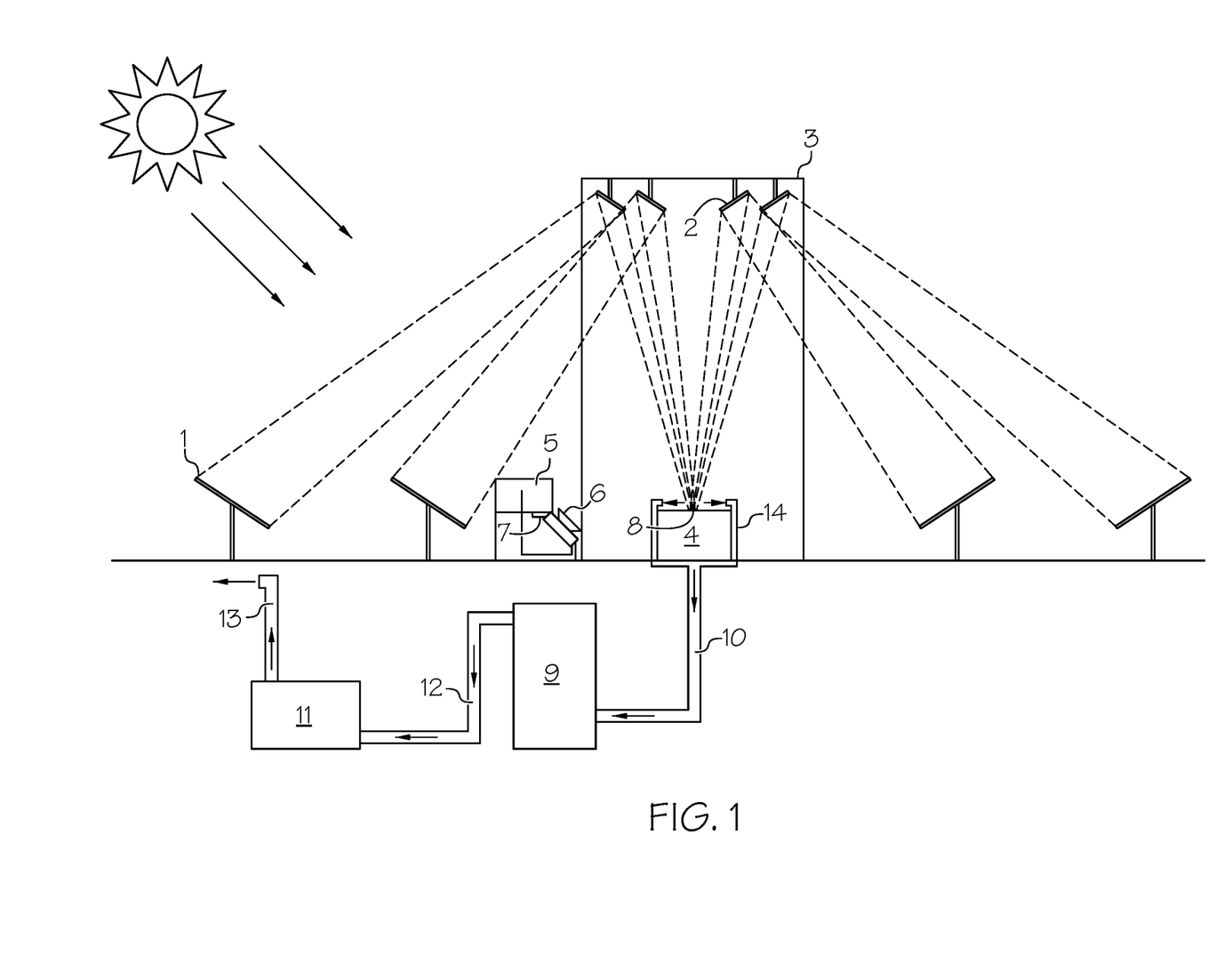
FIG. 1 is a structural schematic view of an exemplary system for reclaiming carbon fibers from carbon fiber containing material using solar energy.

FIG. 1 is a structural schematic view of an exemplary system for reclaiming carbon fibers from carbon fiber containing material using solar energy.

Figure 2:
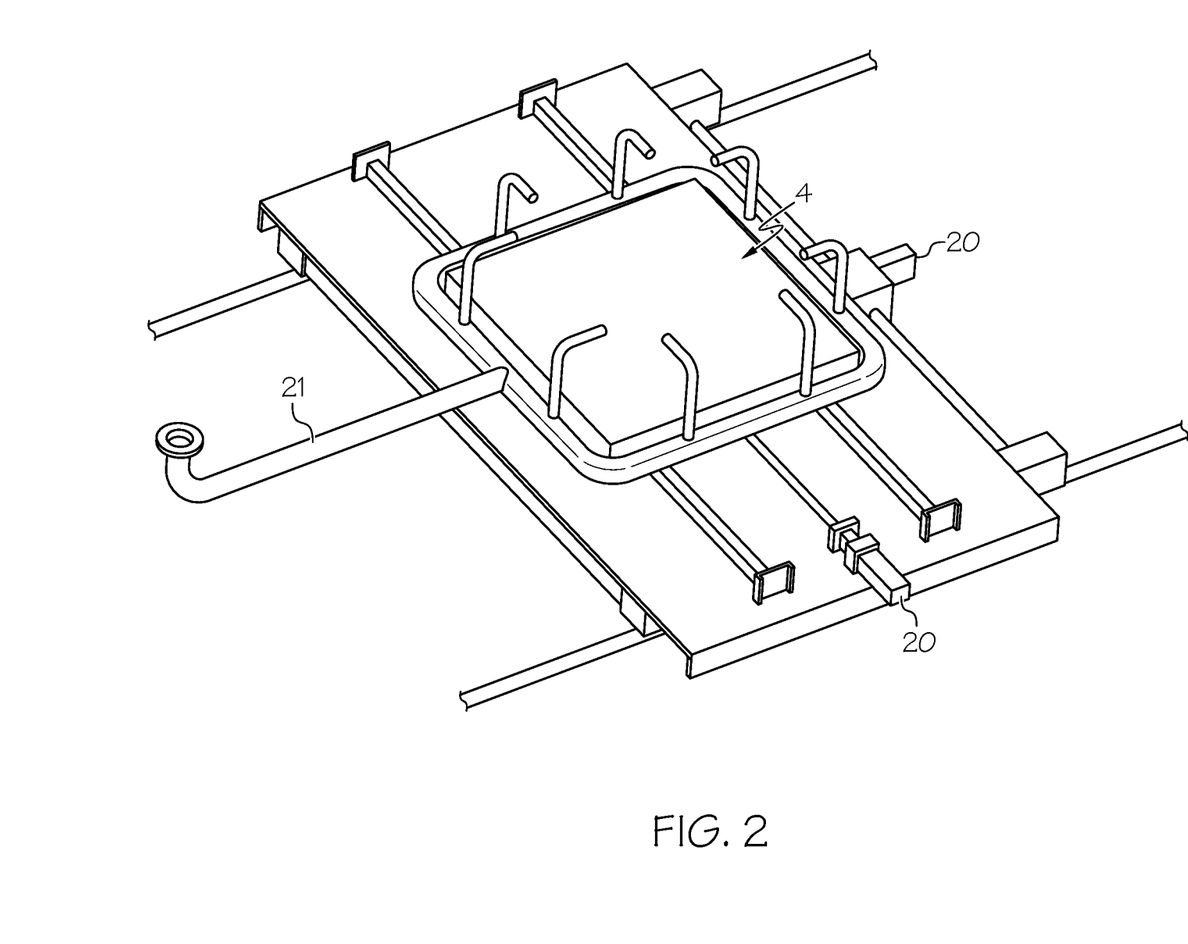
FIG. 2 is a three-dimensional schematic view of an exemplary sample platform of the exemplary system for reclaiming carbon fibers from carbon fiber containing material using solar energy.

FIG. 2 is a three-dimensional schematic view of an exemplary sample platform of the exemplary system for reclaiming carbon fibers from carbon fiber containing material using solar energy.

Figure 3:
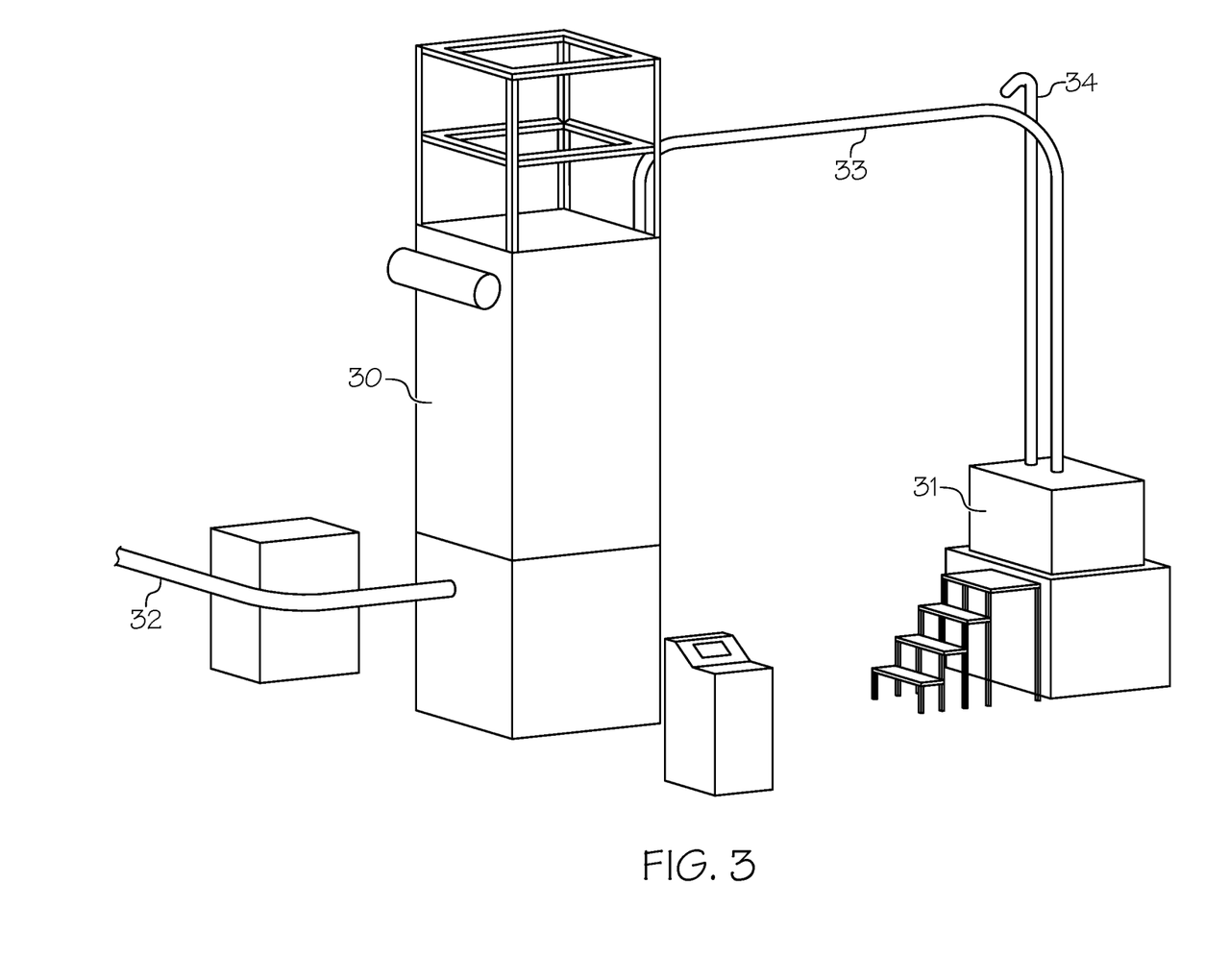
FIG. 3 is a three-dimensional schematic view of a waste gas treatment system of the exemplary system for reclaiming carbon fibers from carbon fiber containing material using solar energy.

FIG. 3 is a three-dimensional schematic view of a waste gas treatment system of the exemplary system for reclaiming carbon fibers from carbon fiber containing material using solar energy.

Figure 4:
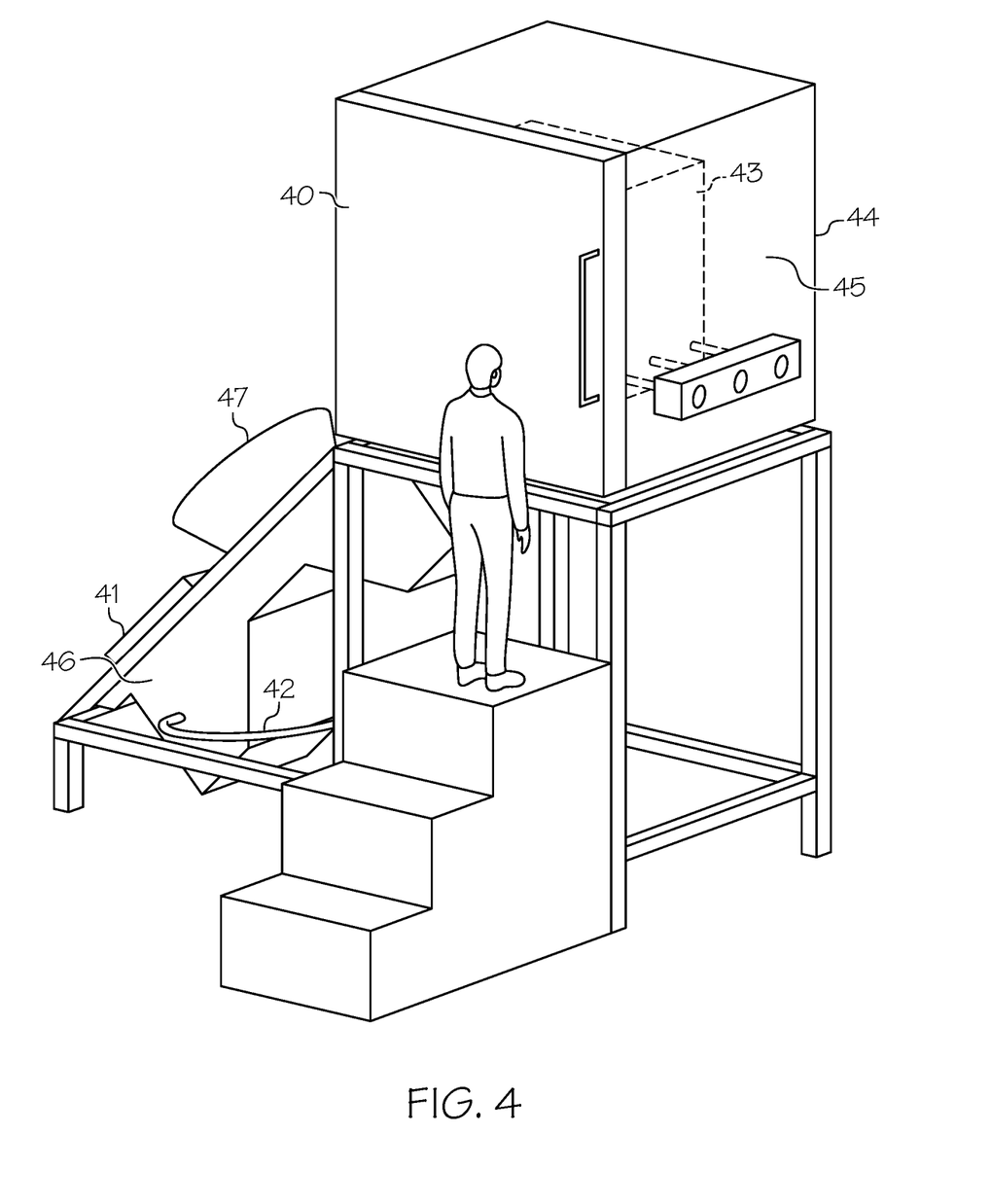
FIG. 4 is a three-dimensional schematic view of a fine treatment furnace of the exemplary system for reclaiming carbon fibers from carbon fiber containing material using solar energy.

FIG. 4 is a three-dimensional schematic view of a fine treatment furnace of the exemplary system for reclaiming carbon fibers from carbon fiber containing material using solar energy.

As shown in FIG. 1, the system includes heliostats 1, planar reflectors 2, a tower 3, a sample platform 4, a heating cabinet 5, a heat sink 6, a molten salt pipe 7, a light spot 8, a dust cleaning apparatus 9, a first gas pipe 10, a gas absorption treatment apparatus 11, a second gas pipe 12, a third gas pipe 13, and a gas absorption pipe 14. The heliostats 1, the planar reflectors 2, and the tower 3 are disposed in a south-north arrangement as a whole, the heliostats 1 being located at both the south and north sides of the tower 3, or each located at the one side of the tower 3, preferably at the north side of the tower 3.

The sunlight focusing system realizes the downward focusing of sunlight to generate light spots 8 having a high thermal flux density. The sunlight focusing system includes 4 to 30 heliostats, 4 to 30 planar reflectors 2 and a tower 3.

The heliostats 1 have two functions, one is to realize the focusing of sunlight, and the other is to reflect the focused sunlight to the planar reflectors 2. Each heliostat 1 includes 8 to 110 concave reflecting mirrors having adjustable or constant mirror radians, preferably with adjustable mirror radians. The reflecting mirrors are disposed in a tile-arranged configuration on a holder with a steel structure, and the holder is supported by a column fixed to the ground. Each heliostat 1 is configured with an independent automatic solar tracking control system and a rotating apparatus that can track solar trace in real time and reflect the focused sunlight to the planar reflectors 2. The heliostats 1 are disposed due south and due north of the tower 3, and to improve the utilization efficiency of sunlight, the heliostats are preferably disposed due north of the tower 3.

All of the planar reflectors 2 are fixed to the top of the tower 3, and the number of the planar reflectors 2 is consistent with the number of the heliostats 1, which are also 4 to 30. Each heliostat 1 corresponds to a planar reflector 2, and the planar reflectors 2 reflect the focused sunlight projected from the heliostat 1 down to the sample platform 4 or the heat sink 6. The planar reflectors 2 are hoisted on the top of tower 3 having a height of 10 to 50 meters, each planar reflector 2 is fixedly connected with the tower 3 via the rotating apparatus, the rotating apparatus is utilized to realize the rotation of the planar reflectors 2, thereby realizing the adjustment of projection positions of light spots 8.

The tower 3 includes a steel member and is used for supporting the planar reflectors 2. The height of the tower 3 is between 10 to 50 meters, which is determined according to the number of the heliostats 1 and the overall design scheme of the system.

As shown in FIG. 2, the sample platform 4 is located directly below the planar reflectors 2 (FIG. 1) and is used for the placement of the carbon fiber material to be pretreated. The sample platform 4 is driven by a servomotor 20 and can accurately move leftward, rightward, forward and backward through the control system, thereby moving the carbon fiber material to adjust the heating locations of light spots.

As shown in FIG. 3, the waste gas treatment system includes a dust cleaning apparatus 30 and a gas absorption treatment apparatus 31. The dust cleaning apparatus 30 is connected with a gas absorption pipe 21 (as shown in FIG. 2) fixed on the sample platform 4 (FIG. 2) through a gas pipe 32 and connected with the gas absorption treatment apparatus 31 through a gas pipe 33. The dust cleaning apparatus 30 removes dust by pulsing filtration, and the gas absorption treatment apparatus 31 uses an alkaline solution as an absorbent. The dust cleaning apparatus 30 is equipped with a large suction blower therein, the waste gas produced in the process of treating carbon fibers may be absorbed into the gas absorption pipe 21, and the particulate dusts may be removed from the waste gas by pulsing filtration. The waste gas subjected to dust cleaning is conveyed to the gas absorption treatment apparatus 31 through the gas pipe 33, the harmful acidic substances in the waste gas are absorbed by the alkaline solution in the gas absorption treatment apparatus 31, so as to complete the decontamination treatment of the waste gas. The decontaminated waste gas is evacuated at a high point through the gas pipe 34.

As shown in FIG. 4, the fine treatment furnace is used to treat the pretreated carbon fiber material, wherein the remaining resin in the pretreated carbon fiber material is further removed by heating with an accurate control of temperature. The fine treatment furnace includes a heating cabinet 40, a heat sink 41 and a molten salt pipe 42. The heating cabinet 40 includes a cabinet liner 43 and a housing 44, interlayer 45 between the cabinet liner 43 and the housing 44 is filled with a high-temperature molten salt, a heat preserved adiabatic apparatus is attached outside the housing, the carbon fiber material placed within the heating cabinet 40 is subjected to a fine treatment utilizing the high-temperature molten salt. The heat sink 41 includes a tubular heat exchanger 46 and a funnel-shaped photomask 47, the molten salt flows within the tubular heat exchanger 46, the funnel-shaped photomask 47 concentrates the light spots projected from the planar reflectors to the tubular heat exchanger 46 to heat the molten salt within the tubular heat exchanger 46. The molten salt pipe 42 communicates a lower end of the interlayer 45 of the heating cabinet 40 with an upper inlet of the tubular heat exchanger 46 of the heat sink 41, and the molten salt pipe 42 communicates an upper end of the interlayer 45 of the heating cabinet 40 with a lower outlet of the tubular heat exchanger 46 of the heat sink 41, therefore, the interlayer 45 of the heating cabinet 40, the molten salt pipe 42 and the heat exchanger 46 of the heat sink 41 form a closed circulation loop. When the system is running, the planar reflectors projects the light spots to the heat sink 41 to heat the molten salt in the tubular heat exchanger 46, the molten salt in the tubular heat exchanger 46 is increased in temperature and decreased in density, wherein the temperature thereof is higher than that of the molten salt in the interlayer of the heating cabinet 40 and the density thereof is lower than that of the molten salt in the interlayer 45 of the heating cabinet 40, and the density difference between the two molten salts will generate a natural-convection flow in the circulation loop of the molten salt under the gravity. The heated high-temperature molten salt will flow to the interlayer 45 of the heating cabinet 40, and the low-temperature molten salt will flow to the tubular heat exchanger 46, to achieve the cyclic flowing of the molten salt.

Figure 5:
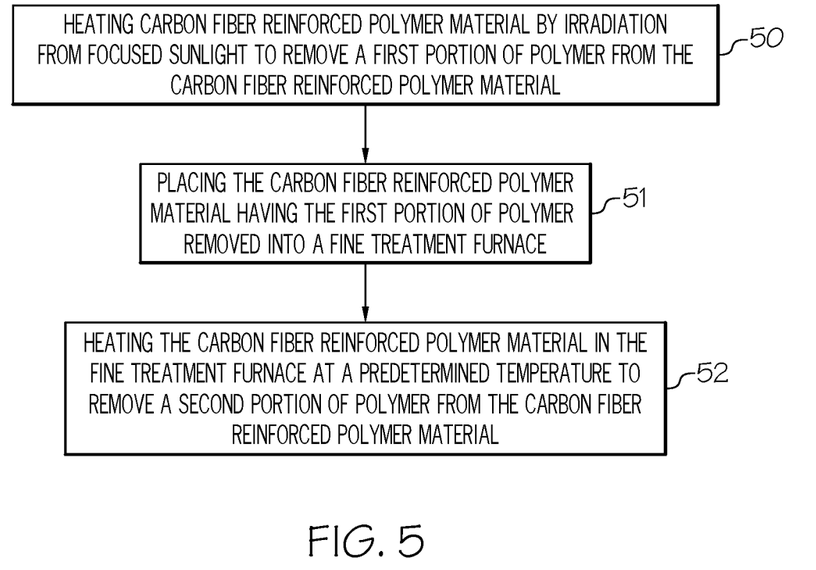
FIG. 5 is a flow chart illustrating an exemplary method for reclaiming carbon fibers from carbon fiber reinforced polymer material using solar energy.

As shown in FIG. 5, a method for reclaiming carbon fibers from carbon fiber reinforced polymer material using solar energy, includes: at block 50, heating carbon fiber reinforced polymer material by irradiation from focused sunlight to remove a first portion of polymer from the carbon fiber reinforced polymer material; at block 51, placing the carbon fiber reinforced polymer material having the first portion of polymer removed into a fine treatment furnace; and at block 52, heating the carbon fiber reinforced polymer material in the fine treatment furnace at a predetermined temperature to remove a second portion of polymer from the carbon fiber reinforced polymer material.

An exemplary method of carbon fiber recycling utilizing the system is divided into two steps:

The first step is pretreatment. The carbon fiber composite material is placed on the sample platform. The carbon fiber composite material is heated via direct irradiation by light spots generated by the sunlight focusing system with the heating temperature being controlled between 400-600° C. and the treatment time of 10-60 minutes, so as to rapidly melt and remove 50-80% of resin in the carbon fibers, and the generated dusts and harmful gas are treated by the waste gas treatment system during the above process.

The second step is fine treatment. The pretreated carbon fiber material in the first step is placed into the fine treatment furnace, the material is heated by an accurate control of temperature, to further remove the remaining resin in the carbon fiber, such that recycled carbon fibers with a high quality are obtained.

Four detailed embodiments of the method for recycling carbon fiber from wasted composite carbon fiber plates utilizing the secondary reflection of sunlight according to the present description are provided below.

First Embodiment

The method for recycling carbon fiber from composite carbon fiber material utilizing the apparatus for recycling carbon fiber using the two-step method according to the present description includes the following steps:

(A) using a square piece of wasted composite carbon fiber having a dimension of 200 mm×200 mm×4.5 mm;

(B) placing the sample of step (A) on the sample platform 4;

(C) keeping the temperature of light spots on the sample platform 4 at 500° C. stably through the digital control system;

(D) moving the sample platform 4 of step (B) in X-axis and Y-axis, such that the wasted composite carbon fiber material is uniformly heated, and the front and back faces thereof are each being radiated for 10 minutes, thus totally for 20 minutes;

(E) taking out the radiated sample of step (D) and placing it into the fine treatment furnace 5;

(F) stably controlling the temperature within the fine treatment furnace 5 at 550° C. through the digital control system;

(G) treating within the fine treatment furnace for 5 minutes;

(H) removing impurities on the surface to obtain fine-treated carbon fibers.

Performance testing is conducted on the carbon fibers recycled in first embodiment:

(i) peeling and damaging situation of the carbon fibers of first embodiment can be determined by visual inspection and digital images;

(ii) through an observation by the scanning of an electron microscope, the surface of the carbon fibers recycled in first embodiment is smoothly treated, and no carbon fibers are damaged during the treating process, and the removal rate of resin is up to 100%, each index satisfies desired requirements.

Second Embodiment

The method for recycling carbon fiber from composite carbon fiber material utilizing the apparatus for recycling carbon fiber using the two-step method according to the present description includes the following steps:

(A) using an elongated piece of wasted composite carbon fiber;

(B) same as first embodiment;

(C) same as first embodiment, keeping the temperature of light spots at 450° C. stably;

(D) (same as first embodiment) radiating the front and back faces each for 15 minutes, thus totally for 30 minutes;

(E) (same as first embodiment);

(F) (same as first embodiment) controlling the temperature within the fine treatment furnace 5 at 500° C.;

(G) treating within the fine treatment furnace for 10 minutes;

(H) (same as first embodiment) obtaining the recycled carbon fibers.

Third Embodiment

The method for recycling carbon fiber from composite carbon fiber material utilizing the solar system apparatus for recycling carbon fiber of the present description includes the following steps:

(A) taking a square piece of wasted carbon fiber plate;

(B) (same as first embodiment);

(C) (same as first embodiment) keeping the temperature of light spots at 430° C. stably;

(D) (same as first embodiment) radiating the front and back faces each for 20 minutes, thus totally for 40 minutes;

(E) (same as first embodiment);

(F) (same as first embodiment) controlling the temperature within the fine treatment furnace 5 at 450° C.;

(G) treating within the fine treatment furnace for 20 minutes;

(H) (same as first embodiment) obtaining the recycled carbon fibers.

Fourth Embodiment

The method for recycling carbon fiber from composite carbon fiber material utilizing the solar system apparatus for recycling carbon fiber of the present description includes the following steps:

(A) taking a square piece of wasted carbon fiber plate;

(B) (same as first embodiment);

(C) (same as first embodiment) keeping the temperature of light spots at 400° C. stably;

(D) (same as first embodiment) radiating the front and back faces each for 30 minutes, thus totally for 60 minutes;

(E) (same as first embodiment);

(F) (same as first embodiment) controlling the temperature within the fine treatment furnace 5 at 450° C.;

(G) treating within the fine treatment furnace for 25 minutes;

(H) (same as first embodiment) obtaining the recycled carbon fibers.

The systems and methods for reclaiming carbon fiber from carbon fiber containing material using solar energy provided by the present description can obtain clean, complete and long but ordered carbon fibers from carbon fiber material through an accurate control of temperature and an innovation in technological process, which is useful for refabrication application of recycled carbon fibers. Through the recycling of carbon fibers by the present description, neither chemical reagents nor fossil fuels are required, all of the energy used by the whole system is obtained from the solar energy collected by the sunlight focusing system, further, the generated waste gases and dusts can be treated very well. The present description has advantages of high treatment efficiency, low energy consumption and reduced environmental pollution, and has good application prospect in the future.

Figure 6:
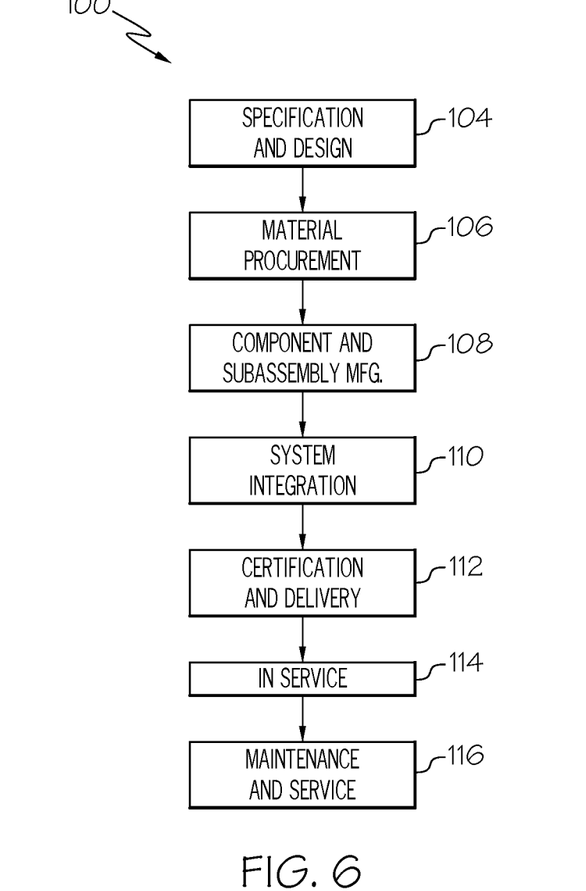
FIG. 6 is flow diagram of an aircraft manufacturing and service methodology.
Figure 7:
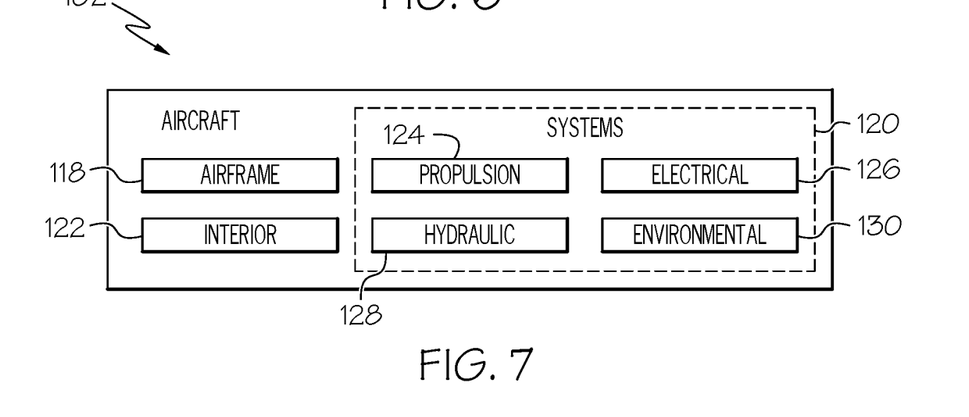
FIG. 7 is a block diagram of an aircraft.

Examples of the present description may be described in the context of an aircraft manufacturing and service method 100, as shown in FIG. 6, and an aircraft 102, as shown in FIG. 7. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed systems and methods for reclaiming carbon fiber from carbon fiber containing material using solar energy may be employed during any one or more of the stages of the aircraft manufacturing and service method 100, particular during material procurement 106, component/subassembly manufacturing 108, system integration 110, and routine maintenance and service 116.

As shown in FIG. 7, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included. The disclosed systems and methods for reclaiming carbon fiber from carbon fiber containing material using solar energy may be employed for any of the systems of the aircraft 902, particularly including any of the system in which carbon fiber containing materials are used. Additionally, the disclosed systems and methods for reclaiming carbon fiber from carbon fiber containing material using solar energy may be employed after retirement of an aircraft 102 from service.

The disclosed systems and methods for reclaiming carbon fiber from carbon fiber containing material using solar energy are described in the context of an aircraft; however, one of ordinary skill in the art will readily recognize that the disclosed systems and methods for reclaiming carbon fiber from carbon fiber containing material using solar energy may be utilized for a variety of vehicles and non-vehicles. For example, implementations of the embodiments described herein may be implemented in any type of vehicle including, e.g., helicopters, passenger ships, and automobiles or in any type of non-vehicle, e.g., sporting goods, construction goods and communication products.

Although various embodiments of the disclosed systems and methods for reclaiming carbon fiber from carbon fiber containing material using solar energy have been shown and described, modifications may occur to those skilled in the art upon reading the specification. The present application includes such modifications and is limited only by the scope of the claims.

What is claimed is:

1. A system for reclaiming carbon fiber from carbon fiber containing material using solar energy, comprising:
   a sunlight focusing system;
   a sample platform for placement of carbon fiber containing material to be treated by focused sunlight from the sunlight focusing system, the sample platform being provided with a gas absorption pipe;
   a fine treatment furnace for receiving and heating carbon fiber containing material treated at the sample platform, the fine treatment furnace comprises: a heating cabinet, a heat sink, and a molten salt pipe; and
   a waste gas treatment system connected with the gas absorption pipe.

2. The system of claim 1 wherein the sunlight focusing system comprises:
   a plurality of heliostats focusing the sunlight; and
   a plurality of planar reflectors reflecting the focused sunlight to the sample platform.

3. The system of claim 2 wherein the plurality of heliostats each comprising a plurality of concave reflecting mirrors.

4. The system of claim 1 wherein the sample platform is driven by a servomotor moving the sample platform leftward, rightward, forward and backward.

5. The system of claim 1 wherein the gas absorption pipe is fixed to a periphery of the sample platform.

6. The system of claim 1 wherein the waste gas treatment system comprises: a dust cleaning apparatus connected with the gas absorption pipe; and a gas absorption treatment apparatus connected with the dust cleaning apparatus.

7. The system of claim 6 wherein the dust cleaning apparatus removes particulate dusts from gas absorbed into the gas absorption pipe by way of dust removal by filtration.

8. The system of claim 6 wherein the gas absorption treatment apparatus absorbs acidic substances in gas by utilizing an alkaline solution as an absorbent.

9. The system of claim 1 wherein the heating cabinet comprises a cabinet liner and a housing, wherein an interlayer between the cabinet liner and the housing is filled with a molten salt, and wherein a heat preserved adiabatic apparatus is attached outside the housing.

10. The system of claim 9 wherein the heat sink comprises a tubular heat exchanger and a funnel-shaped photomask, wherein the tubular heat exchanger contains a molten salt therein, wherein the funnel-shaped photomask concentrates sunlight from the sunlight focusing system to the tubular heat exchanger to heat the molten salt within the tubular heat exchanger.

11. The system of claim 10 wherein the molten salt pipe communicates a lower end of the interlayer of the heating cabinet with an upper inlet of the tubular heat exchanger of the heat sink, and communicates an upper end of the interlayer of the heating cabinet with a lower outlet of the tubular heat exchanger of the heat sink.

12. The system of claim 10 wherein a working temperature of the molten salt is 400-580° C., and the molten salt is a binary mixed salt of $KNO_3$ and $NaNO_3$.

13. The system of claim 1, further comprising a digital control system achieving an automatic control for the reclaiming of carbon fibers from carbon fiber containing material using solar energy, the digital control system comprising a data acquisition device, a data transmission device, a control host and a monitoring software.

14. A method for reclaiming carbon fibers from carbon fiber reinforced polymer material using solar energy, comprising:

heating carbon fiber reinforced polymer material by irradiation from focused sunlight to remove a first portion of polymer from the carbon fiber reinforced polymer material;

placing the carbon fiber reinforced polymer material having the first portion of polymer removed into a fine treatment furnace, said fine treatment furnace includes a heating cabinet, a heat sink, and a molten salt pipe; and heating the carbon fiber reinforced polymer material in the fine treatment furnace at a predetermined temperature to remove a second portion of polymer from the carbon fiber reinforced polymer material.

15. The method of claim 14 wherein the carbon fiber reinforced polymer material is heated at between 350-600° C. by the irradiation from focused sunlight.

16. The method of claim 15 wherein the carbon fiber reinforced polymer material is heated by the irradiation from focused sunlight to remove 40-80% of polymer from the carbon fiber reinforced polymer material.

17. The method of claim 16 wherein the carbon fiber reinforced polymer material is heated in the fine treatment furnace to remove the remaining polymer from the carbon fiber reinforced polymer material.

18. The method of claim 14 wherein the carbon fiber reinforced polymer material is thermosetting resin-matrix composite material containing carbon fibers.

19. A system for reclaiming carbon fiber from carbon fiber containing material using solar energy, comprising:

a sunlight focusing system;

a sample platform for placement of carbon fiber containing material to be treated by focused sunlight from the sunlight focusing system, the sample platform being provided with a gas absorption pipe; and a fine treatment furnace for removing resin from the carbon fiber containing material treated at the sample platform.

20. The system of claim 19 further comprising a waste gas treatment system connected with the gas absorption pipe.

\* \* \* \* \*